Aug. 17, 1943.  I. COWLES  2,326,929
METALLIC CONDUIT AND COUPLING THEREFOR
Filed June 30, 1941
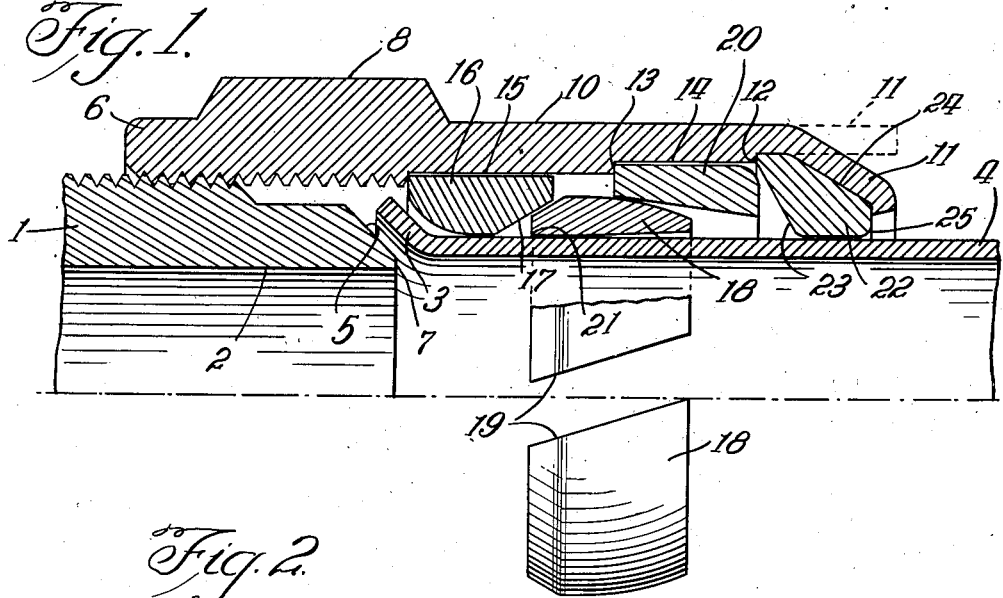
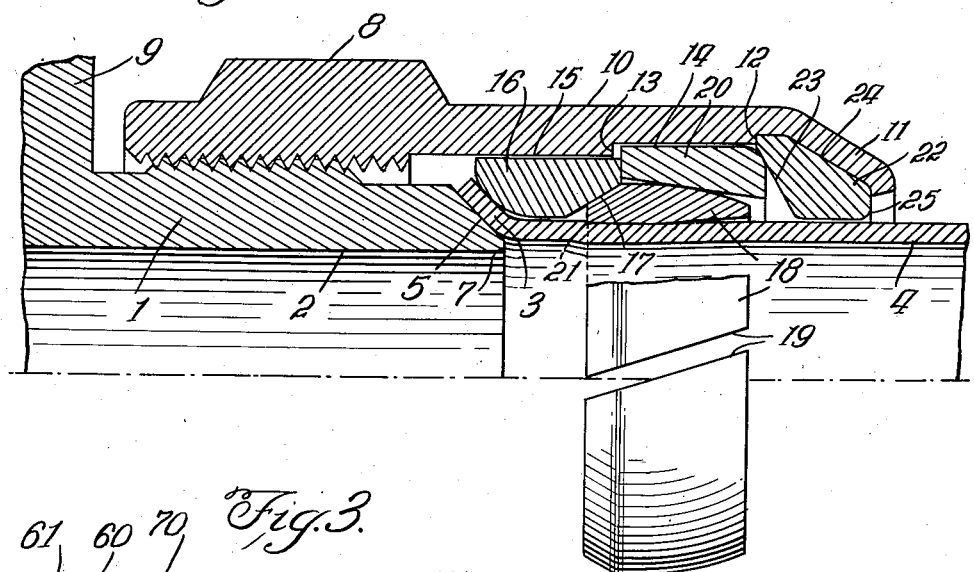
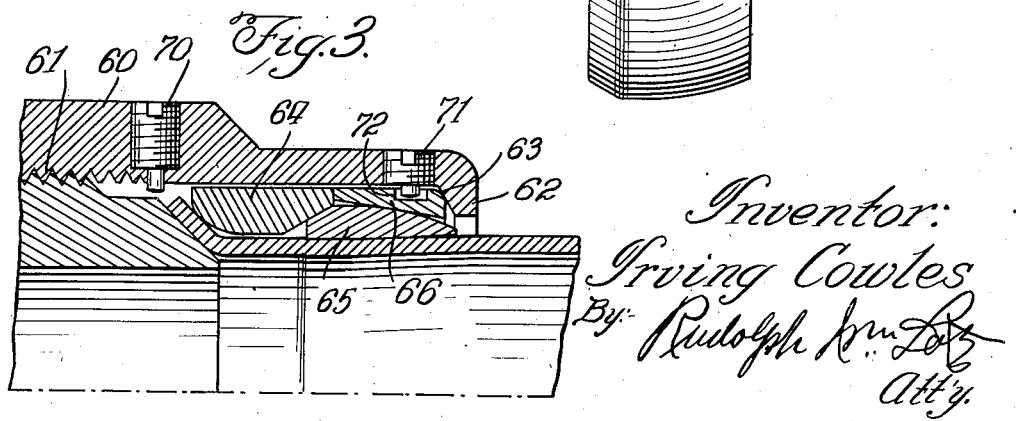
Inventor:
Irving Cowles Patented Aug. 17, 1943

2,326,929

UNITED STATES PATENT OFFICE 2,326,929

METALLIC CONDUIT AND COUPLING THEREFOR

Irving Cowles, Detroit, Mich., assignor to Irving Cowles and Rudolph W. Lotz, Chicago, Ill., successor cotrustees to Union Bank of Chicago, Illinois, a corporation of Illinois Application June 30, 1941, Serial No. 400,395

8 Claims. (Cl. 285—86)

This invention has for its main object to provide means for so coupling a metal tube with a source of supply or discharge of fluid under pressure as to insure a fluid-tight joint under all of the conditions incident to and affecting the junction of the flared end of a length of tubing with a coupling member equipped with a seat for said flared end regardless of the degree of taper of the latter and the seat therefor, and whereby the fluid-tight connection will be maintained against all of the forces, such as vibration and temperature changes, which commonly cause loosening of the coupling means and consequent leakage of fluid.

A further object of the invention is to provide a coupling for metal tubing which includes a resilient self-expanding radially contractible split sleeve and a means for effecting contraction thereof to grip the tube against longitudinal movement with respect to the coupling and wherein said split sleeve is equipped with means for effecting diffusion of vibration stresses on the tube along an appreciable length of the latter and wherein the means for effecting contraction of said sleeve serve also to limit the contraction thereof to a predetermined degree, and wherein said contracting means co-operate with other elements to effect fluid-tight connection of the tube with a companion fluid transmission means.

Another important object of the invention is to provide a coupling of the type specified which relieves the flared end of the tube from all stresses which tend to cause fracture of the same and wherein all vibration stresses on the tube are diffused along a portion thereof spaced appreciably from said flared end.

Another object of the invention is to provide a sleeve member of a coupling possessing the aforesaid advantageous characteristics which contains the co-operative elements whereby the aforesaid objects are attained, and wherein said elements are permanently maintained in their predetermined relative positions, thus to prevent the loss of any one or several of said elements or their re-assembly in respectively wrong positions.

Still another object of the invention is to provide a coupling of the type specified wherein the sleeve member with its contained parts may be sold as a replacement for other types of sleeve nuts for assembly with the male coupling members of metal tube couplings for flanged tubing equipped with seat formations of different degrees of taper.

In the accompanying drawing, there are illustrated two different embodiments of the invention, and in said drawing:

Figure 1 is a fragmentary radial sectional view of a coupling constructed in accordance with the invention, the contained parts of the sleeve member thereof being shown in their loosely assembled relation.

Figure 2 is a view similar to Fig. 1 showing the coupling showing all parts of the same in their final positions after the sleeve member thereof has been turned with relation to the seat member to clamp the tube flange upon its seat.

Figure 3 is a view similar to Figure 2 showing a modified form of construction of the coupling.

The invention relates particularly to the type of metal tubing couplings popularly known as the "S. A. E." type, the same being a standard type approved by the Society of Automotive Engineers, and being adapted for use in connection with tubing of copper, brass and aluminum and other soft malleable metals commonly used in the automotive and other industries and also adapted for use in connection with thin walled tubing of hard metal which is not adapted or intended to be threaded.

In the production of soft metal tubing, the outer diameter of every specific size varies, the variations being termed "tolerances." The latter are limited to some thousandths of an inch, plus or minus, depending upon the sizes thereof. The tube size or diameter is commonly designated by the abbreviation "O. D." ("outer diameter"), and said abbreviation will be used herein.

In all couplings for the type of tubing aforesaid, the externally threaded male member 1 of the coupling is provided with an axial bore 2 of slightly smaller than the smallest inner diameter of the tube to be associated therewith and is bordered at the end opposed to the flange 3 of the tube 4, with a seat formation 5 which, generally, varies in taper from an angle of thirty to a maximum of forty-five degrees to the axis of said coupling member 1.

The pressure exerted upon the seat 5 and flange 3 by the opposed portion of the sleeve member 6, tends, obviously, to contract the seat portion of the member 1 and it is for that reason that said seat portion must be sufficiently thick to resist contraction under the influence of such pressure. This necessitates the smaller axial bore of the male member than the smallest inner diameter (I. D.) of the tubing, also substantially fixed by the aforesaid tolerances. Thus the seat end of the member 1 presents a relatively narrow annular shoulder 7. The bore 2 of said member 1 determines the volume of flow of fluid through the tubing under any fixed degree of pressure.

In order that said rate of flow may be assured, it is necessary that the tube associated with the coupling shall not be reduced as to its inner diametric or cross-sectional area to less than the cross-sectional area of the bore 2.

It is a very important object of the present invention to make provision in the female member for firmly gripping the tube along a portion thereof spaced from the said flange 3, and that it prevent said gripping means from contracting this portion of the tubing to a degree to reduce its flow capacity to less than that of the bore 2.

The said grip on the tube last referred to must be sufficient to relieve the flange 3 thereof from all tensile and tortional stresses as well as vibration stresses, all of the latter tending to effect fracture of the flange 3 which is necessarily thinner than the wall of the tubing and is rendered more brittle than the latter in its formation by spinning or other commonly practiced methods.

In the formation of said flange 3, in the absence of exercise of great care, the axis of said flange may become eccentric to the axis of the tube and cause the flange to be of different lengths at diametrically opposed points, the peripheral edge of the said flange in the place of its junction with the tube being then disposed angularly to the axis of the tube and to the axis of the bore 2.

When this occurs in the standard S. A. E. type of connection, the eccentricity of the tube with respect to the bore of the male member 1 remains unchanged and causes the portion of the tube embraced by the sleeve nut to hug one side of the bore of the latter and be spaced appreciably from the diametrically opposite portion of said bore, and increases the stresses upon the flange 3 with the result that fracture of the latter occurs sooner than it would if the bore 2 and tube were axially aligned. Aside from the eccentricity, the axes of the member 1 and tube 4 are inclined to each other.

It is also important, and especially so under the conditions referred to in the next preceding paragraph, that the pressure exerted upon the flange 3 shall be along a circle spaced from the peripheral edge of the flange and also from the junction of the latter with the tube. It is also of great importance that in the coupling and uncoupling operations the tube be relieved of all tortional stresses and that the coupling be so constructed as to effect aligning of the tube with the bore of the male member during the coupling operation. Hence, further important objects of the invention are to provide coupling means which accomplish the several purposes set forth in this paragraph.

The sleeve member 6 includes a thick internally threaded and externally hexagonal portion embracing the threads of the male member 1, the latter also including a thick end portion 9 which may, as shown in Fig. 2, be an integral part of a suitable means for associating said male member with a source of supply of fluid under pressure or a member into which said fluid is to be delivered. Generally said portion 9 is also a hexagonal part of the male member and is of a diameter substantially equal to that of the portion 8 of the sleeve nut 6.

The latter includes the extension sleeve portion 10 which, as indicated by the dotted line portion 11, is normally cylindrical externally along its terminal end portion.

The said sleeve portion 10, including the terminal portion 11, is provided with a stepped bore which is of largest diameter in said portion 11 and extends from the extremity of the latter to the annular shoulder 12. From the latter to the shoulder 13 there is a smaller diameter bore portion 14 and from the shoulder 13 to the inner end of the thread of the nut 6 there is a still smaller bore portion 15 which is of diameter substantially equal to the root diameter of the said thread. The bore portions aforesaid constitute bearings for ring and sleeve members hereinafter described.

Disposed within and substantially snugly, but loosely fitting the bore portion 15, is an unbroken ring member 16 which is cylindrical externally and has a bore between its ends of a diameter slightly larger than the largest O. D. of the tube 4 to be passed therethrough, tolerances considered.

The end of the said member 16 opposed to the flange 3 of the tube 4, (said flange 3 being formed after the tube 4 is passed through the nut 6) is arcuate in longitudinal section so that it will engage the flange 3 along a circular area of relatively small width between the ends of said flange 3 which, in the instance of soft metal tubing, will become partially embedded in said flange by compression thereof responsively to rotation of the nut 6 in one direction and the pressure imposed upon said member 16 as a result thereof.

The other end of the bore of the member 16 is flared at an angle of about thirty degrees to its axis, as shown at 17.

Engaged at one end portion in the said flared bore portion 17 is normally expanded split sleeve 18 composed of a resilient hard metal.

The gap 19 of the sleeve 18 is of such width that it will not close entirely when contracted by the ring member or sleeve 20 in co-operation with the flared end of the bore of the member 16.

The bore of the sleeve 18 is very slightly tapered from about its middle to its outer end. The other end of said bore is substantially cylindrical and terminates in a sharp inner annular edge 21. The diameter of the last-named bore portion is normally slightly larger than the largest O. D. tube to be embraced thereby, tolerances considered. The purpose of the sharp edge 21 is to bite and form a relatively abrupt shoulder in the tube immediately below the same which co-operates with the split sleeve to positively prevent withdrawal of the tube from the seat of the male member by tension on the tube.

The circumferential face of the sleeve 18 is curved and convex in longitudinal section except as to the end portion thereof to be received within the flared outer end of the bore of the member 16, said end of sleeve 18 being tapered to fit said flared bore portion. From the end of said tapered surface of said sleeve 18 to its outer end, the curvature is effected on a constantly decreasing radius, the latter being of great length at all points compared with the average diameter of said sleeve.

The unbroken sleeve 20 is confined between the shoulder 13 of the portion 10 of the nut 6 and the unbroken ring member 22. The latter is confined between the shoulder 12 and the inturned outer end or flange portion 11 of the sleeve portion 10. Both ring members 20 and 22 are held against any appreciable degree of longitudinal movement with respect to the sleeve portion 10, but the member 20 is freely rotatable with relation thereto and to the member 22, the latter being preferably non-rotatable.

The bore of the sleeve 20 is slightly tapered throughout its length at an angle approximating seven degrees to its axis. The degree of said taper is a very important factor determined by considerations hereinafter explained.

The inner diameter of the sleeve 20 at the end opposed to the member 16, is less than the diameter of the bore portion 15 of the sleeve portion 10, but the diameter of the bore of sleeve 20 at said end is preferably the same as the largest diameter portion of the split sleeve 18 when the latter is expanded to the greatest degree permitted by the members 16 and 20, as shown in Fig. 1. Said split sleeve 18 may be of larger normal inner diameter than last-mentioned and such larger diameter is advantageous in that it constitutes an assurance against "setting" of said sleeve to a small enough diameter to prevent it from becoming non-slidable along the tube 4 after said sleeve has been contracted to a smaller inner diameter than the outer diameter of the tube 4.

The member 22 is provided with a cylindrical bore of a diameter to receive freely a tube 4 of largest O. D. intended to be passed therethrough, tolerances considered. Said member 22 is cylindrical internally and externally and is equipped with a tapered inner end surface 23, and a tapered outer end surface 24. The flange 11 includes the inner terminal lip formation 25 bearing upon the outer end 26 of the member 22 which is of double convex contour. The taper of the surface 23, is substantially thirty degrees to the axis of the member 22.

When first disposed about the tube 4, before the flange 3 is formed, the component parts of the sleeve member 6 will be positioned as shown in Fig. 1, due to the pressure exerted upon the members 16 and 20 by the resilient split sleeve 18.

In Fig. 1, the flange 3 is still spaced from the seat 5 of the member 1, but the nut 6 has a long threaded engagement with said member 1.

As rotation of the nut 6, clockwise with respect to the member 1, is continued, the flange 3 becomes engaged with the seat 5 before any change in position of the members 16, 18, 20 and 22 takes place. As such rotation continues, the member 20 forces the split sleeve toward the flange 3 (with which the member 16 is in contact the instant that the said flange contacts its seat) and thus forces the member 16 constantly into compressing relation to the flange 3 at the same time that the split sleeve 18 is being contracted progressively by the sleeve 20. Such contraction ceases when the inner end of the sleeve 20 contracts the outer end of the member 16. Thereafter a final fifteen or twenty degree turn of the nut 6 causes the member 16 to compress the flange 3 upon the seat 5 to assure a fluid tight joint between the tube 4 and the member 1. During this final turn of the nut 6 the member 18, which has been theretofore sliding along the tube 4 a distance of a few thousandths of an inch its diameter is also being reduced progressively, attains the limit of its contraction. During the sliding movement of said sleeve 18 it effects contraction of the tube 4 throughout a length slightly greater than that of said split sleeve and thus spaces the outer tapered bore portion thereof from the portion of the tube initially contracted thereby. This leaves a very shallow annular gap between the tapered bore portion of the sleeve 18 and the opposed surface of the tube 4 which widens progressively toward the outer end of the member 18. At the inner end of the last-named member a relatively sharply defined shoulder is formed in the tube 4 which obviously serves to take up all tension stress on the tube and thus relieves the flange 3 therefrom.

All vibration of the tube ends within the last-named annular gap. The very slight taper of the said bore portion diffuses the vibration stresses over a very appreciable length of the tube and thus distinguishes the instant structure from prior art structures known to the applicant wherein the outer end of the sleeve nut of the coupling presents a relatively sharp annular corner against which the tube impinges during vibration thereof. Such contact causes crystallization and fracture of the metal of the tube, the life of the latter being greatly increased by the provision of the long annular gap last-above referred to and resultant diffusion of the vibration stresses.

The resistance of the tube 4 to contraction causes the split sleeve 18 to also resist contraction by the sleeve 20 to such a degree that the said sleeve obtains such a strong frictional grip upon the sleeve 18 as serves to prevent any loosening of its hold responsively to vibration and temperature changes. Said grip is so strong that substantially the same degree of force must be applied to the nut 6 to start the uncoupling operation, with respect to the final turn of the nut 6 through an arc of fifteen to twenty degrees. A reverse turn through substantially the same length of arc under substantially the degree of power application is required to initiate the uncoupling operation. This resisted initial turn of the sleeve 6 is generally termed "drag" and is of vital importance in the prevention of loosening of the sleeve 6 by vibration and temperature changes.

The increase in life of the tubing due to the diffusion of the vibration stresses plus the safety factor incident to the grip of the sleeve 18 upon the tube and the grip of the sleeve 20 upon the sleeve 18 which eliminates danger of any relief of the pressure of the flange 3 upon the seat 5 and relief of all tension, tortional and vibration stresses from the flange 3, all operate to render the coupling of great advantage as a safety factor of extremely vital importance to aviation, maritime operations and land operations of mechanized equipment. All aircraft, warships and mechanized army equipment may become inoperative through a seemingly insignificant leak at a conduit joint as is commonly experienced in the sudden failure of hydraulic brakes of automobiles.

Obviously, the members 16, 20 and 22 are axially aligned with the nut 6 and the internal threads thereof except as to the lateral play permitted by the aforesaid clearance between members and their bearings. In couplings of the S. A. E. type, the thread engagement of the nut 6 with the member 1 is very snug and long, the tolerances allowed being very limited. All possible relative lateral movements between the nut 6 and member 1 are completely eliminated as soon as rotation of nut 6 is resisted appreciably by pressure exerted upon the flange 3. The member 20 is automatically centered within the nut 6 by the tapered surface 23 of the member 22 and it in turn, similarly centers the split ring 18 and the ring 16 with respect to the nut 6.

The coupling is then rendered a self-aligning structure.

In the structure of this invention, the tube 4 will become automatically substantially accurately aligned axially with the member 1 progressively during the coupling operation. This is due to the fact that the instant that any point in the flange 3 contacts the seat 5, the contraction of the sleeve 18 will begin and that contraction-force is exerted absolutely radially of the tube 4 and will act to bend the flange 3 into seating relation to the seat 5. The resistance to that contraction also imposes a tension stress upon the threads of the members 1 and 6 and thus obviate any relative lateral movements of said members. The tube 4 is thus held axially aligned with the member 1 as the member 20 approaches the member 16. At the instant of contact of sleeve 20 with member 16, the flange 3 will still be in contact at only one point with the seat 5 if said flange is initially eccentrically disposed as above described. Following contact, last-mentioned, the member 16 will be forced toward the seat 5 while it remains axially aligned with the members 1 and 6 except to the extent of its bearing tolerance. Thus the member 16 will correct the bend of the flange 3 as it approaches the seat 5 until the seat formation of the member 16 has clamped the flange upon the seat 5 to the degree necessary to insure the desired fluid-tight connection between the tube 4 and the member 1. The structure is, therefore, appropriately termed a "self-aligning" coupling.

The uncoupling operation is just as important as the coupling operation and, as to the former, it is obvious that the split sleeve 18 must expand to clear the annular recess in the wall of the tube 4 as the rotation of the nut 6 is reversed and the sleeve 20 is moved away from the member 16 and, at the same time, along the sleeve 18 until the sleeve 20 is restored to or approximately to the position of Fig. 1 with relation to the sleeve 18. When the sleeve 20 has attained a position wherein its pressure on the sleeve 18 has been relaxed appreciably, its said movement will continue without causing the sleeve 18 to follow the sleeve 20. The inner end of the sleeve 18 will relieve itself of any pressure exerted upon said end portion by the flared outer end of the bore member 16.

The clearance between the smallest diameter portion of the sleeve 18 and the tube 4, if the latter is of the maximum O. D. fixed by the standard tolerance allowed, as aforesaid, may be five thousandths of an inch radially, for example, or twice that diametrically. The extent to which the tube 4 is contracted by the split sleeve 18 whether said tube is of the minimum or maximum O. D. fixed by tolerance allowance, must be so limited that the duct of the tube portion so contracted by the sleeve 18 is of no smaller I. D. than the bore 2 of the member 1.

This degree of contraction of the collar 18 is determined by the degree of taper of the bore of the sleeve 20 and the length of its movement from the position of Fig. 1 to the position of Fig. 2. As it is desirable that the travel of the sleeve 20 shall be short, the contour of the circumferential face of the sleeve 18 is such that the sleeve 20 climbs up upon the same during its travel as from the position of Fig. 1 to the position of Fig. 2. At the latter position the diameter of the sleeve 18 is greater than at the point of contact with the bore of sleeve 20 shown in Fig. 1. Thus the frictional hold of the sleeve 20 upon the sleeve 18 increases progressively and attains its maximum degree when the latter has attained the limit of its contraction.

The contour of the end of the member 16 opposed to the flange 3 of the tube is such that it will enable the sleeve element 6 to replace the sleeve nut of any male member 1 whether the seat 5 thereof is of 45° taper or of more gradual taper.

Because of the free rotation of the members 16, 18 and 20 with respect to the member 6 and of the members 16, 20 and 22 with respect to each other, the tube 4 is not subjected to the slightest tortional stress during the above described coupling and uncoupling operations but when both ends of the tube are coupled with the above described coupling structures, the hold of the latter upon the tube 4 is such that said couplings may be rotated in opposite directions and thus twist said tube until it resembles a rope without breaking joint with the tube. This strong hold is of vital importance in all instances because it constitutes reliable assurance against leakage at the joints of the resulting conduit.

The structure of Figs. 1 and 2 is of such length and such slightly greater inner diameter than the tube 4 that the latter must be straight throughout such a length in excess of that of the member 6 as will enable the latter to slide along the tube 4 until the flange 3 projects from the thread-end of nut 6 in order that the flange 3 may be cut off and the nut 6 removed if it is desired to replace an old tube 4 with a new one.

An advantage of soft-metal tubing is that it is easily bent and in many instances, it is either necessary or desirable to bend the same in closer proximity to the outer end of the nut 6 than the structure of Figs. 1 and 2 will permit.

To meet this requirement the structure of Fig. 3 is substituted for that of Figs. 1 and 2.

In the structure of Fig. 3, the bore of the nut 60 is cylindrical from its internally threaded end portion 61 to the terminal annular flange 62 which is provided with the internally tapered surface 63 corresponding to the surface 23 of the member 22.

Removably mounted in said nut 60 is the ring member 64, the split sleeve 65 and the sleeve 66 corresponding respectively with the members 16, 18 and 20 of the structure of Figs. 1 and 2.

The relation and mode of operation of the structure of Fig. 3 corresponds with that of Figs. 1 and 2, the only difference between the latter and the structure of Figs. 1 and 2 being that the members 64, 65 and 66 are removable and that the member 22 of Figs. 1 and 2 is replaced by the said flange 62 which performs the same function.

In uncoupling the structure of Fig. 3 the nut 60 becomes capable of being disposed angularly to the axis of the tube 1 as soon as the threads 61 thereof become disengaged from the threads of the male member 1 to a slight degree and increasingly so as it is moved outwardly to the position wherein the sleeve 66 becomes disposed at the normal outer limit of its movements responsively to expansion of the split sleeve 65 to the position wherein the threaded end of the nut 60 is opposed to the ring member 64 after being disengaged from the threads of the male member, said ring member 64 after being then capable of becoming disposed slightly angularly of its normal position. But after the threaded end of the nut 60 has passed the ring member 64, it can be disposed sharply angularly to the axis of the member 1 because of the wide annular space between the sleeve 65 and the 4.

The drawing is four times the actual size of the structures of Figs. 1, 2 and 3 as made for a five-eighths inch O. D. tube.

The ring member 22 of Figs. 1 and 2 is the equivalent of the flange 62 and vice versa.

While it is preferred to provide the ring members 16 and 64 respectively, with the outer tapered bore portion to receive the inner end portion of the split ring, that portion of the ring 16 and 64 may be cut away to the point at which the inner end of the split sleeve ends in Figs. 2 and 3 to shorten said ring members without appreciable disadvantage to the structure of Figs. 1 and 2 and with some advantage to the structure of Fig. 3 in that the nut 60 would sooner reach a position wherein it may be turned sharply angularly to the axis of the tube 4.

The resiliency of the split sleeves of the several structures must be such that it will expand to an inner diameter equal to and preferably greater than the O. D. of the tube 4 as otherwise the uncoupling operation would be seriously affected, especially in the structure of Figs. 1 and 2, because in the structure of the latter said split ring is inaccessible to an expansion tool to engage in the slot of said split sleeve. In the structure of Fig. 3 the nut 60 and sleeve 64 may be moved to completely expose the split sleeve 65 for expansion.

In order that the component parts of the structure of Fig. 3 may be retained in the assembled relation shown, a set-screw 70 is mounted in the sleeve nut to project into the same at a point spaced from the ring member and which will be so spaced from the threads of the male member when the parts are disposed as shown as to not interfere with the tightening of the sleeve nut to produce the desired fluid-tight connection between the male member and the tube. A few turns of said set-screw 70 will permit the ring member, the split sleeve and the tapered bore nut to be removed if desired.

Another set-screw 71 is mounted in the sleeve nut to engage loosely in the annular groove 72 of the tapered bore sleeve to cause the latter to move outwardly with the sleeve nut during the uncoupling operation in order to overcome the possibility of the said sleeve becoming so tightly jammed upon the split sleeve because of the very slight taper of the bore of said sleeve as might cause it to remain fixed while the sleeve nut moves outwardly into engagement with a bend of the tube before the sleeve nut can be caused to move about said bend and before the end of the tapered bore nut is accessible through the threaded end of the sleeve nut for disengaging it from the split sleeve. Said screw 71 may be withdrawn from engagement in said groove 72 when it is desired to remove the tapered bore sleeve from the sleeve nut. Said screw 71 may also be omitted but the opening for same provided in order to insert any suitable means through said opening to engage in said groove 72 as the sleeve nut is rotated reversely to cause the tapered bore sleeve to become disengaged from the split sleeve.

A plurality of the respective set screws 70 and 71 may be provided in equally spaced apart positions arcuately if desired, but one of each is sufficient.

The tapered bore sleeves shown in the several figures of the drawing may be replaced by cylindrical bore sleeves of inner diameter equal to the greatest outer diameter portion of the split sleeve when the latter is in its fully contracted state as shown in Figs. 2 and 3, though the tapered bore sleeves are preferable as affording a greater degree of frictional resistance to reverse movement of the sleeve nut by increasing the aforesaid drag on the latter to effect uncoupling of the structure.

The taper of the bore of the tapered bore sleeve may be one, two or three degrees, depending upon the degree of drag desired but is preferably no more than seven degrees. The last-mentioned taper has been found to be more satisfactory.

So also the circumferential surface of the split sleeve may be that of a double truncated cone meeting in an annular ridge between the ends of said split sleeve.

The contour of the flared mouth of the ring member 16 of the coupling, which engages the tube flange, constitutes an important feature of the invention.

In all instances, the seat 5 of the male member 1 is equipped with the terminal shoulder 7, the bore of said male member being spaced from the duct of the tube a distance substantially equal to the width of said shoulder 7.

The reason for this is that the seat portion of said male member is subjected to enormous pressure as the tube flange is compressed upon the same and must be sufficiently sturdy to prevent that pressure from contracting the bore portion of the male member bordered by said seat. In instances where the taper of the seat is less than at an angle of forty-five degrees to the axis of the said bore, the danger of such contraction is increased proportionately to the decrease of the seat taper and the resulting decrease in average thickness of the metal between said bore and said seat.

The pressure upon the tube flange exerted by the ring member should be concentrated mainly at a point in the tube flange and seat which is spaced appreciably from the said annular shoulder 7 and at which the thickness of metal between seat and bore is such that it can bear said pressure without danger of contracting the said bore.

The shape of the flared mouth of the ring member is therefore, such that the pressure exerted upon the tube flange will be concentrated along an annular substantially line contact which is spaced from the junction of the tube flange with the tube body and also from the shoulder 7 so that said line contact will be substantially equally spaced from said junction regardless of the degree of taper of the flange and the seat for same.

It will be observed that a free annular space is left between the ring member and said flange and tube junction and the immediately adjacent portions of the tube and flange. The purpose of this annular space is to enable the tube flange to be more easily bent by the ring member in the event that said flange is eccentric to the tube axis as hereinabove described, in view of the self-aligning function of the split sleeve 18 and the tapered bore sleeve 20. The said free space exposes more length of the tube for bending by the ring member to correct the eccentricity of the flange of the tube and relieves resulting stress that might be detrimental to the life of the tube or might result in fracture thereof along the junction of the tube and flange which might occur in instances where the bore of the ring member hugs closely the tube and its said junction with the flange.

The curvature of the flared mouth of the ring member is substantially arcuate in radial section but may be of substantially progressively decreasing radius from its inner to its outer end. It is preferable that the annular line of pressure exerted upon the tube flange shall be on an arcuate part of the flared mouth of the ring member and that the curvature of said flared mouth be such that said line of contact is always substantially the same distance from the shoulder 7 regardless of whether the seat-taper is thirty degrees or at any angle between the latter, as a substantially standard minimum, and forty-five degrees as the fixed standard maximum.

A further advantage of the aforesaid shape of the mouth of the tube flange compressing element of the coupling lies in the fact that the tube flange generally contacts its seat over the inner surface of said flange and, in instances where the element which engages the outer surface of the flange rotates with respect to the latter until it is fully compressed against the seat, the smaller area of contact of the outer surface of the flange with the said flange compressing surface than the area of contact of said flange with its seat, will reduce, very appreciably, the tortional stress on the flange and tube. That is a matter of appreciable importance to the life of the tube.

Obviously, the foregoing advantages will apply to whatever element of the coupling is designed to bear upon the tube flange to clamp it upon its seat.

I claim as my invention:

1. A coupling of the type specified comprising a male member equipped with a seat for the flange of a metal tube, a sleeve nut having threaded engagement with said male member and equipped with means for engaging an unsplit ring member with the tube flange to force and hold the latter upon said seat, an unsplit ring member disposed within the nut in the path of said means, the latter equipped with a tapered bore having its larger diameter end opposed to said ring member, and a resilient normally diametrically expanded and longitudinally non-collapsible metallic split sleeve disposed with one end in engagement with said ring member within said nut and having an outer surface portion between its ends of greater diameter than other outer surface portions thereof and of no greater diameter than the mouth of the bore of said means opposed to said ring member, said means operating to contract said split sleeve to predetermined smaller diameter than said tube as said means move toward and into engagement with said ring member.

2. A structure as defined in claim 1 wherein the split-sleeve is equipped with a substantially cylindrical bore.

3. A structure as defined in claim 1 wherein the split-sleeve is equipped with a substantially cylindrical bore in the end portion thereof opposed to the ring member and wherein the other end portion of said bore is flared.

4. A structure as defined in claim 1 wherein said means consists of a sleeve rotatably mounted within the sleeve nut and the latter is equipped at its outer end with a means for engaging the outer end of said last named sleeve.

5. A structure as defined in claim 1 wherein the threads of the sleeve nut project inwardly of the bore of the nut between the ends of the latter and wherein said means for effecting contraction of the split sleeve are confined against removal from the other end of said nut and cooperate with said threads to confine said ring member and split sleeve permanently within said nut.

6. A structure as defined in claim 1 wherein an end portion of the split sleeve and the opposed end portion of the ring member are equipped with cooperating formations serving to promote contraction of said split sleeve responsive to forced movement of the latter toward said ring member by said means.

7. A coupling for flanged tubing comprising a male member equipped with a tapered seat for the flange of a metal tube, a sleeve nut having threaded engagement with said male member and having its largest inner diameter portion disposed between its ends, and means disposed within said largest inner portion of said nut and confined against escape therefrom by smaller inner diameter end portions of said nut, said means including an unsplit annular member disposed for engagement with the flange of the tube and a radially contractible metallic split sleeve element lying between said annular member and the other end portion of said nut, the last-named end portion of said nut equipped with means for effecting contraction of said split sleeve element and engaging said annular member in succession responsive to rotation of said nut in one direction relative to said sleeve.

8. A coupling comprising a member equipped with a seat for the flanged end of a tube, a sleeve nut having threaded engagement at one end with said member and equipped at its other end with an annular shoulder, an unsplit ring equipped with a substantially sphero-convex surface adapted to bear upon the flange of the tube and at its other end with a tapered bore portion, a resilient metal sleeve equipped with a single longitudinal slot of predetermined width throughout its length and having an outer substantially barrel-shaped surface and an axial bore cylindrical through a part of its length and progressively enlarged along its outer end portion, the cylindrical bore portion of said split sleeve projecting in part into the tapered bore portion of said unsplit sleeve, and a member rotatable within and engaged by said annular shoulder of said nut and embracing and engaged with the largset diameter portion of said split sleeve for cooperation with said bore portion to effect contraction of the latter to close the slot thereof while also causing the same to transmit pressure of said shoulder upon the rotatable member to said unsplit ring for effecting fluid-tight joint connection between the tube flange and its seat.

IRVING COWLES.